(12) United States Patent
Nishikawa et al.

(10) Patent No.: US 7,009,790 B2
(45) Date of Patent: Mar. 7, 2006

(54) MAGNETIC TRANSFER APPARATUS

(75) Inventors: Masakazu Nishikawa, Kanagawa (JP); Kazuhiro Niitsuma, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 531 days.

(21) Appl. No.: 10/176,115

(22) Filed: Jun. 21, 2002

(65) Prior Publication Data

US 2003/0048557 A1 Mar. 13, 2003

(30) Foreign Application Priority Data

| Jun. 21, 2001 | (JP) | 2001-188223 |
| Jun. 26, 2001 | (JP) | 2001-193092 |
| Jun. 27, 2001 | (JP) | 2001-194826 |
| Jun. 29, 2001 | (JP) | 2001-199071 |
| Jul. 4, 2001 | (JP) | 2001-203492 |
| Sep. 28, 2001 | (JP) | 2001-302232 |

(51) Int. Cl.
*G11B 5/86* (2006.01)

(52) U.S. Cl. ............................... 360/17; 360/15; 360/16
(58) Field of Classification Search .................. 360/15, 360/16, 17
See application file for complete search history.

(56) References Cited

U.S. PATENT DOCUMENTS 6,347,016 B1 * 2/2002 Ishida et al. .................. 360/17

* cited by examiner

*Primary Examiner*—David Hudspeth
*Assistant Examiner*—Glenda P. Rodriguez
(74) *Attorney, Agent, or Firm*—Sughrue Mion, PLLC

(57) ABSTRACT

The present invention enables to execute accurate magnetic transfer without signal omission and the like, by bringing a master carrier which bore transfer information and a slave medium to undergo transfer into close contact with each other uniformly and without a gap when they are received in a holder and brought into confronted close contact with each other.

In a magnetic transfer apparatus for executing magnetic transfer by applying magnetic field for transfer generated by a magnetic field applying apparatus after master carriers 3, 4 which bore transfer information and a slave medium 2 to undergo transfer are brought into confronted close contact with each other and received in a holder 10, materials 6, 7 having elastic characteristic are interposed between the holder 10 and master carriers 3, 4, thereby allowing microdeformation of master carriers 3, 4 to enhance the close contact capability with the slave medium.

6 Claims, 7 Drawing Sheets

(a)

(b)

MAGNETIC TRANSFER APPARATUS

TECHNICAL FIELD

The present invention relates to a magnetic transfer apparatus for executing magnetic transfer from a master carrier bearing information to a slave medium.

BACKGROUND OF THE INVENTION

In general, as amount of information is increased, a magnetic recording medium is demanded which is of mass storage to record a large quantity of information, as well as low-priced, and preferably enables so-called high speed access that can read out a necessary part within a short time. As an example of such a medium, a hard disc and a high-recording density flexible disc are known, and so-called tracking servo technique, in which a magnetic head accurately scans a narrow track width and generates signals with a high S/N ratio, is playing an important role for realizing such mass storage. In one revolution of disc, a servo tracking signal, an address information signal, a regenerative clock signal and the like are recorded in a predetermined space in so-called prefomat.

The magnetic head is allowed to accurately run over the tracks by reading these prefomat signals and correcting its own position. Recently, the prefomat is fabricated by recording discs one by one or tracks thereof one by one using an exclusive servo writer. However, because such a servo writer is very expensive and the fabrication of prefomat is time-consuming, this process occupies a large part of manufacturing cost and it is desired to reduce cost of process.

Meanwhile, it has been proposed to realize the mass storage by a magnetic transfer method, not by recording tracks one by one in prefomat. For example, such a magnetic transfer method is disclosed in Japanese Unexamined Patent Publication Nos. 63-183623, 10-40544, 10-269566 and etc. The magnetic transfer is a process to execute transfer of a magnetic pattern corresponding to information (for example, a servo signal) born in a master carrier by applying magnetic field for transfer in the state that the master carrier and slave medium are in close contact with each other, wherein recording can be executed statically without changing the relative position between the master carrier and the slave medium, whereby it is possible to execute accurate prefomat recording and the time needed for the recording is very short.

In addition, the magnetic transfer is a process for executing transfer of a magnetic pattern corresponding to information (for example, a servo signal) born in a master carrier by applying magnetic field for transfer in the state that the master carrier and slave medium are in close contact with each other. For example, such a magnetic transfer method is disclosed in Japanese Unexamined Patent Publication Nos. 63-183623, 10-40544, 10-269566 and etc.

Furthermore, if the slave medium is a disc-shaped medium such as a hard disc or a high-recording density flexible disc, magnetic field for transfer is applied by a magnetic field applying apparatus located in one side or both sides of slave medium and consisted of an electromagnet(s) or permanent magnet(s) in the state that disc-shaped master carriers are brought into contact with one or both side surfaces of the slave medium.

In order to improve the quality of transfer in said magnetic transfer, it is an important task how to bring the master carrier and slave medium into close contact without any gap.

That is, there will be problems in that if there is poor close contact, a non-magnetic transfer region may generated, and if magnetic transfer is not generated, signal omission may be caused in the magnetic information transferred onto the slave medium, thereby deteriorating the quality of signal, and if the recorded signals are the servo signals, a satisfactory tracking function can not be obtained and reliability will be lowered.

In view of the above circumstances, in order to bring the master carrier and slave medium into close contact without any gap and uniformly in magnetic transfer, it has been proposed to enhance the flatness of surface of a holder and maintaining the master carrier and to adsorb the master carrier in reference to the surface to enhance the flatness of the master carrier itself, thereby securing the close contact of master carrier and slave medium (Japanese Patent Application No. 2001-144296).

The present invention was conceived in consideration of the above problems in mind. The object of the present invention is to provide a magnetic transfer apparatus adapted to enhance the quality of transfer signals by increasing the close contact capability of master carrier and slave medium in magnetic transfer by providing a material having elastic property between the master carrier and the holder.

Also, in a conventional magnetic transfer apparatus, a slave medium is forced down against a master carrier by applying compression force by a compressing means in order to increase the close contact capability between the slave medium and master carrier. Such a mechanical contact force applying method is preferred in that a high pressure can be obtained but difficult to uniformly apply a pressure on the contacted surfaces of slave medium and master carrier.

Due to this, a vacuum method in which the internal side of holder that received a master carrier and a slave medium is adsorbed, thereby obtaining a force for close contact is more preferable because the pressure is uniformly applied all over the entire surface of the holder so that the condition of uniform close contact can be realized. However, in the above vacuum method, the maximum pressure difference between the inside and outside of the holder is about 1 atm., and thus it is impossible to obtain a sufficient force for close contact between the master carrier and slave medium, as it is.

Therefore, the inventors have investigated whether a force for close contact can be increased if the mechanical application of pressure by means of a screw is combined with the vacuum method. However, there was a problem in that if the force was mechanically applied as explained in the above, the distribution of pressure became non-uniform, thereby impinging on the quality of transfer signals. In addition, if the vacuum method with chamber structure was used for bringing the master carrier and the slave medium into close contact with each other, it was difficult to enhance the force for close contact depending the construction of holder and local deformation was occurred due to uneven contact. For example, it can be considered that the holder comprises a lower side chamber for fixing a master carrier and an upper side chamber for pressing down the slave medium against the master carrier, wherein a sealing material such as an O-ring is contactedly inserted between the top surface of lower side chamber and the bottom surface of upper side chamber thereby sealing the receiving space. In this construction, when the internal vacuum level was increased, the sealing material was crumpled and thus both of chambers were directly contacted with each other, whereby it was impossible to apply force any more. Due to this, close contact becomes nonuniform and local signal omission was occurred.

The present invention was conceived in consideration the above problem in mind. The object of the present invention is to provide a magnetic transfer apparatus adapted to be able to execute good magnetic transfer by obtaining a sufficient force for close contact only by means of vacuum adsorption of the internal side of holder when the slave medium and master carrier is brought into close contact with each other.

Also, poor close contact of said master carrier and slave medium occurs sometimes because deposited material is present between the master carrier and slave medium, and a gap occurs near the deposited material and causes poor close contact, whereby non-magnetic transfer area may be produced. When magnetic transfer was executed over a number of times, it has been found that signal omission caused by such deposited material is usually produced at the periphery of closely contacted surfaces of master carrier and slave medium. According to the analysis of the deposited material, there were a number of particles formed from components identical to those of the elastic member interposed between the master carrier and the holder for receiving and bring the slave medium and the master carrier into confronted close contact in order to enhance the close contact capability of the master carrier and slave medium.

The present invention was conceived in consideration of the above problem in mind. The object of the present invention is to provide a magnetic transfer apparatus adapted to improve the quality of signal by reducing the generation of signal omission in magnetic transfer.

In addition, the conventional magnetic transfer is executed by bringing a master carrier and a slave medium into close contact with each other, wherein it is required to perform the positioning of master carrier and slave medium in the state of close contact. Because the master carrier and slave medium undergo friction at the time of positioning, as magnetic transfer is repeated, the shape of patterned surface of the master carrier (unevenness shape) that bore information will be abraded and the accuracy of transfer will be degraded. Furthermore, the unevenness pattern is generally coated with a magnetic layer, a lubricant layer or the like on a substrate that retains the unevenness pattern, and as it is repeatedly contacted with and released from a number of slave mediums, the magnetic layer on the patterns and the like may be partially deficient or peeled off from the substrate. If the accuracy of transfer is degraded due to the abrasion, release of magnetic layer and the like, it is required to replace the master carrier. However, because such a master carrier is expensive, it is a very important subject in suppressing costs for manufacturing magnetic recording mediums how many slave mediums using one master carrier can execute transfer on.

The present invention was conceived in consideration of the above situation. The object of the present invention is to provide a magnetic transfer method that can execute magnetic transfer on much more slave mediums using one master carrier and can obtain good transfer signals.

In addition, particularly when magnetic transfer is simultaneously executed on both surfaces of slave medium by bringing each of master carriers into contact with each surface of slave medium and applying magnetic field for transfer to the both surfaces, higher accuracy of close contact is required because each of master carriers must be uniformly in close contact with each surface of slave medium. Although said slave medium and master carriers are received within the holder in confronted close contact with each other, the accuracies of holder and of retaining by the holder as well as the accuracy of the master carriers themselves are required.

As a result of analysis of signal omission in a magnetic pattern magnetically transferred to a slave medium by applying magnetic field for transfer to execute magnetic transfer simultaneously on both surface of the slave medium, after one slave medium and two master carriers on both sides of the slave medium were inserted between a upper holder member and a lower holder member and then brought into confronted close contact with each other by applying a force for close contact, it has been found that the positional relationship between the master carriers of both sides has a large influence on the omission of signals.

The present invention was conceived in consideration of this problem in mind. The object of the present invention is to provide a magnetic transfer apparatus adapted to enhance the quality of transfer signals by increasing the close contact capability between the master carriers and slave medium in simultaneous magnetic transfer on both sides.

SUMMARY OF THE INVENTION

According to an aspect of the present invention there is provided a magnetic transfer apparatus which executes magnetic transfer by applying magnetic field for transfer after a master carrier that bore transfer information and a slave medium to be subjected to transfer are brought into confronted close contact with each other and received within a holder, characterized in that a material having an elastic property is interposed between the holder and the master carrier.

Young's modulus of the material having elastic property is preferably in a range of not less than $5.0\times10^{-5}$ Pa and not more than $3.0\times10^{-2}$ Pa. Also, the thickness of the material having elastic property is preferably in a range of not less than 0.01 mm and not more than 1.0 mm.

According to another aspect of the present invention, there is provided a magnetic transfer apparatus which comprises a holder for receiving a master carrier that bore transfer information and a slave medium to be subjected to transfer within a closed space so that they are brought into confronted close contact with each other, and a vacuum suction means for evacuating said closed space of holder to obtain a force for close contact between said slave medium and master carrier, and a magnetic field applying apparatus for applying magnetic field for transfer, wherein the effective area (SV) of adsorbed region of said holder and the contact area (SD) between the master carrier and slave medium satisfy the following relationship:

$$1.2 \leq (SV/SD) \leq 16.0$$

That is, in the present invention, the area of adsorbed region of closed space was increased in order to obtain a predetermined force of close contact by means of vacuum adsorption only. According to analysis performed using this area as a parameter, it was possible to obtain uniform close contact capability by establishing the effective area (SV) of adsorbed region and the contact area (SD) between the master carrier and the slave medium to satisfy the relationship of $1.2 \leq (SV/SD) \leq 16.0$. In the region of $1.2>(SV/SD)$, it had a serious problem that quality of signals was degraded because a force for close contact was insufficient. On the contrary, in the region of $(SV/SD)>16.0$, although it was possible to secure quality of signals, deformation of master carrier and damage of pattern were generated because applied voltage was too high.

Preferably, said holder is formed in a construction of cylinder comprising a lower side chamber, an upper side chamber that is relatively movable to be contacted with and separated from said lower chamber, and a sealing material that slidably contacts with the surfaces of the both chambers extended parallel to the moving direction for contact and separation, and thus seals the internal space formed by said upper side chamber and lower side chamber.

According to another aspect of the present invention, there is provided a magnetic transfer apparatus which executes magnetic transfer by applying magnetic field for transfer after a master carrier that bore information signals and a slave medium to be subjected to magnetic transfer are brought into confronted close contact and received within a holder, characterized in that an elastic member is interposed between the holder and the master carrier and preferably the quantity of dusts having a size of 0.5 $\mu$m or over is not more than 0 particles/cm$^2$ and the quantity of dusts having a size of not less than 0.3 $\mu$m and less then 0.5 $\mu$m is not more than 5 particles/cm$^2$, generated from the surface of said elastic member. In this case, said elastic member was formed from a material having a low dustability or treated with cleaning process for removing dusts so as to establish the quantity of dusts with a size of 0.5 $\mu$m or over is not more than 0 particles/cm$^2$ and the quantity of dusts with a size of not less than 0.3 $\mu$m and less then 0.5 $\mu$m is not more than 5 particles/cm$^2$, even when it undergoes repeated close contact and release with respect to the slave medium. Also, a particle smaller than 0.3 $\mu$m will be difficult to cause signal omission in view of the size and the like of pattern according to information to be transferred.

The Young's modulus of said elastic member is preferably not less than $5.0 \times 10^{-5}$ Pa and not more than $3.0 \times 10^{-2}$ Pa. The pressure applied at the time of said magnetic transfer is preferably not less than $9.8 \times 10^{-5}$ Pa and not more than $4.9 \times 10^{-3}$ Pa. In addition, the thickness of said elastic material is preferably not less than 0.01 mm and below 1.0 mm.

In addition, at the time of magnetic transfer, the slave medium is previously magnetized by initial direct-current magnetization in the direction of tracks in the surface if it is inplane recording, or in the normal direction if it is perpendicular recording. It is preferred to execute magnetic transfer in such a way that the slave medium and the master carrier formed with a magnetic layer on the fine unevenness pattern corresponding information to be transferred are brought into close contact with each other, and magnetic field for transfer is applied in the track direction or in the normal direction substantially opposite to the initial direct-current magnetization direction. Servo signal is preferred for said information.

According to another aspect of the present invention, there is provided a magnetic transfer method in which magnetic field for transfer is applied in the state that a master carrier provided with an unevenness pattern on a surface thereof for transferring information onto a magnetic layer of a slave medium and said slave medium are confronted, so that said information is magnetically transferred to said magnetic layer of slave medium, characterized in that the spacing between said master carrier and said slave medium is 1~100 nm when said magnetic field for transfer is applied. Herein, "the spacing between said master carrier and said slave medium" is used to mean the distance from the prominent surface of unevenness pattern in the surface of said master carrier to the surface of slave medium. In the expression, "the spacing is 1~100 nm," although it is preferred if the distance is consistent all over the region where the master carrier and slave medium are confronted, it is sufficient if the minimum of spacing is 1 nm or more and the maximum value is 100 nm or less because it is difficult to maintain the uniformity due to self-flexural and the like of the master carrier and slave medium.

In order to assure the spacing between the master carrier and slave medium to be 1~100 nm, a supporting convex part, which has a surface higher than the prominent surface of said unevenness pattern, may be provided on a non-transfer region out of the transfer region of the master carrier provided with the unevenness pattern for transferring information onto the slave medium, to be brought into close contact with the slave medium, so that the unevenness pattern of master carrier and surface of slave medium may be spaced with a predetermined distance and supported without being touched with each other. Alternatively, it is possible to use means such as a holder for separating and supporting the master carrier for magnetic transfer and slayer medium with a predetermined spacing.

According to another aspect of the present invention, there is provided a magnetic transfer apparatus which simultaneously executes transfer on both surfaces of a slave medium by applying magnetic field for transfer after the master carriers that bore transfer information are brought in confronted close contact on both side recording surfaces of the slave medium to be subjected to transfer, respectively and received within a holder, characterized in that the deviation in parallelism between the master carriers of both sides is not more than 50 $\mu$m, and preferably not more than 5 $\mu$m. In this case, the deviation in parallelism between the surfaces of both holder members each retaining a master carrier is not more than 50 $\mu$m, preferably not more than 5 $\mu$m. Also, the deviation between the central positions of said master carriers on both sides is preferably not more than 10 $\mu$m. Furthermore, the deviation between the central positions of both holder members each retaining a master carrier is preferably not more than 10 $\mu$m. The deviation in parallelism means the difference between the nearest distance and the farthest distance when master carriers on the both sides or both holder members are confronted.

According to the present invention, by interposing a material having elastic characteristic between a holder and a master carrier, when the master carrier and a slave medium are brought into close contact with each other, the master carrier is allowed to be somewhat deformed by the pressure, whereby it is possible to secure uniform close contact between the master carrier and slave medium.

By setting the Young's modulus of said material having elastic characteristic in the range of not less than $5.0 \times 10^{-5}$ Pa and not more than $3.0 \times 10^{-2}$ Pa, it is possible to secure a good close contact state. If the Young's modulus is less than $5.0 \times 10^{-5}$ Pa, it is impossible to secure a sufficient close contact capability because the elastic material absorbs a force generated between the master carrier and slave medium. Furthermore, if the Young's modulus exceeds $3.0 \times 10^{-2}$ Pa, the master carrier is not smoothly deformed by the pressure for close contact and conversely increases the space between the master carrier and slave medium, thereby causing signal omission.

By setting the thickness of said material having elastic characteristic in the range of not less than 0.01 mm and not more than 1.0 mm, it is possible to secure a good close contact state. If this thickness is less than 0.01 mm, the deformation of master carrier is restricted and lacks close contact capability, and if it exceeds 1.0 mm, plastic deformation is caused when the deformation of master carrier is increased, whereby there is possibility to make the master carrier non-usable.

In addition, if a close contact force between a master carrier and a slave medium received within a holder is made to be obtained by vacuum suction of closed space of holder, it is possible to apply an uniform pressure, and by setting the area ratio (SV/SD) of an effective area (SV) of vacuum suction region of holder and a contact area between the master carrier and slave medium in the range of 1.2~16.0, the slave medium and master carrier are brought into uniform close contact with each other with a predetermined contact pressure, whereby it is possible to execute good magnetic transfer with a high transfer signal quality. If said area ratio (SV/SD) is increased to enlarge the area of closed space of holder as compared to the contact area of slave medium, the pressure acting on a portion which does not retain master carrier is applied for the close contact of master carrier and slave medium, thereby increasing the force for close contact. By setting the area ratio to be not less than 1.2, it is possible to obtain required close contact in uniform, whereby the close contact capability can be enhanced and to secure good transfer signal quality without local signal omission, and by setting the area ratio to be not more than 16, the applied pressure is not to be excessive, whereby it is possible to prevent deformation and damage of pattern from being caused in the master carrier, thereby enhancing the endurance.

If the holder takes a construction of cylinder, the pressure produced by vacuum suction effectively acts on the closely contacted surfaces of master carrier and slave medium and the force for close contact is increased, whereby an uniform close contact state can be obtained. The uniformity of close contact force is remarkably improved as compared to mechanical application of pressure, whereby local signal omission will not be occurred.

Also, in the present invention, if an elastic member whose generation quantity of dusts having size of 0.5 $\mu$m or over is 0 particles/cm$^2$ and size of not less than 0.3 $\mu$m and less than 0.5 $\mu$m is at most five particles/cm$^2$ is interposed between a holder and a master carrier when executing magnetic transfer after the master carrier and slave medium are in confronted close contact with each other and received within the holder, deposited material due to generation of dusts from the elastic member is reduced thereby inhibiting poor close contact and largely reducing signal omission, and the elastic member is deformed in the form of deposited material when the force for close contact is applied, thereby reducing gap-formed extent between the master carrier and slave medium around the deposited material, whereby signal omission created extent can be narrowed and the quality transfer signals can be enhanced.

Still yet, if the magnetic transfer method of the present invention is performed in such a manner that the magnetic field is applied in the state that a master carrier and a slave medium is spaced 1~100 nm, it is possible to reduce friction produced between the slave medium and unevenness pattern of master carrier, and to effectively prevent the abrasion of unevenness pattern at the time of positioning of slave medium and unevenness pattern, especially because the friction between the slave medium and unevenness pattern which is considered as a major reason of unevenness can be reduced. Also, because the unevenness pattern of master carrier and slave medium are not in close contact with each other, deficiency and ablation of magnetic layer can be prevented, which were caused by the repeated close contact and release of master carrier and slave medium. Therefore, the service life of master carrier can be increased and magnetic transfer for more slave mediums will be possible. By this, it is possible to reduce the cost of magnetic transfer, whereby preformat-completed slave mediums can be provided in a low price.

According to the present invention, when each of master carriers is brought into confronted close contact with each recording surface of a slave medium and then master transfer is simultaneously executed on both sides, if the deviation in parallelism between the master carriers of both sides is set not more than 50 $\mu$m, and preferably not more than 5 $\mu$m it is possible to obtain uniform entire close contact, whereby it is possible to resolve signal omission, and it is possible to execute simultaneous transfer of both sides with a high transfer signal quality.

BRIEF DESCRIPTION OF THE DRAWINGS

The embodiments of the present invention will be explained with reference to the accompanying drawings, in which.

DETAILED DESCRIPTION OF THE INVENTION

Figure 1:
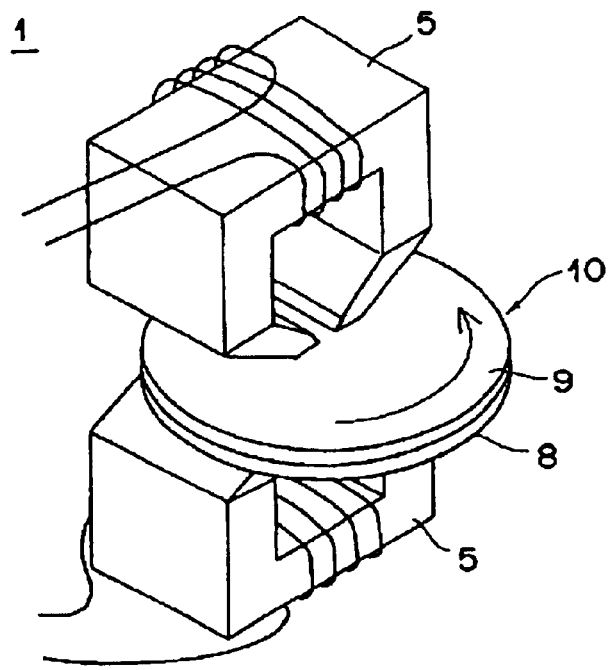
FIG. 1 is a perspective view of main parts showing the state of transfer of magnetic transfer apparatus according to one embodiment of the present invention.
Figure 2:
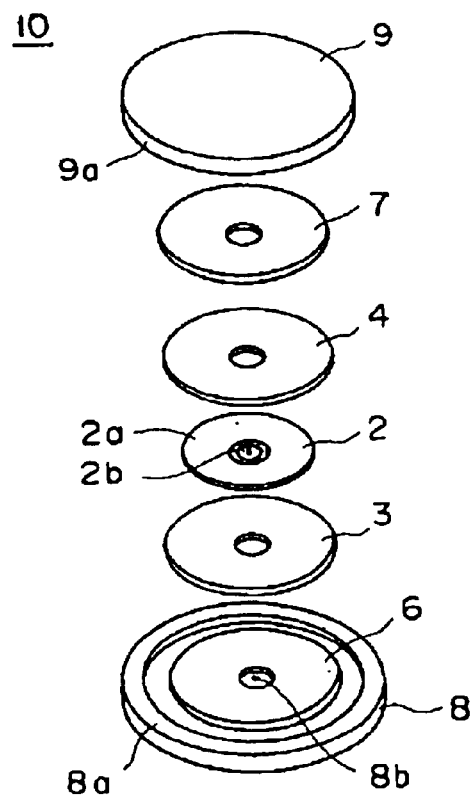
FIG. 2 is an exploded perspective view of a holder shown in FIG. 1.
Figure 3:
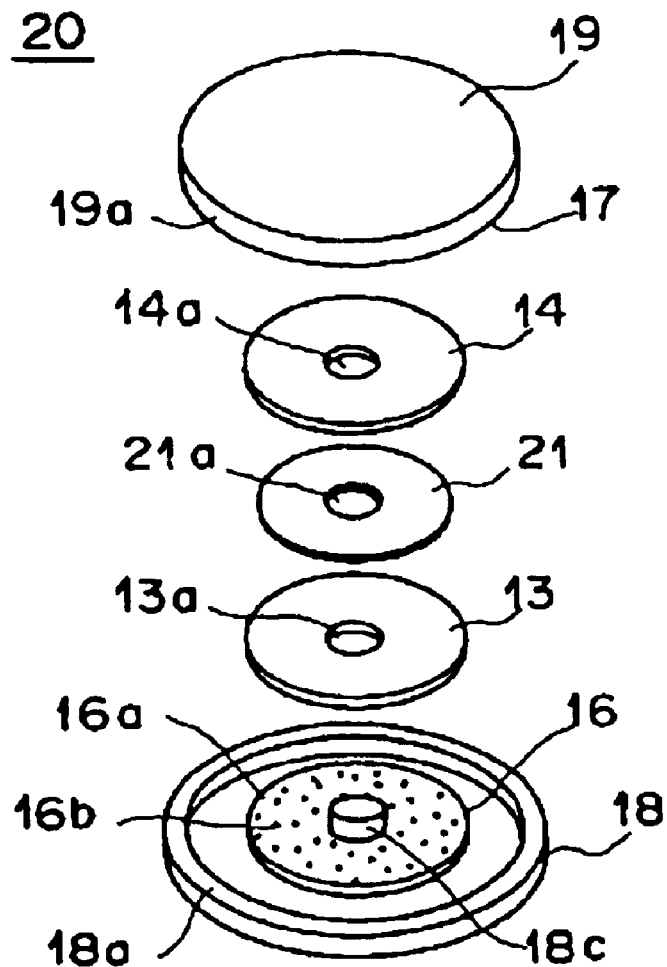
FIG. 3 is an exploded view of a holder according to another embodiment of the present invention.

Herein below, an embodiment of the present invention will be described in detail. FIG. 1 is a perspective view of main parts showing the state of transfer of magnetic transfer apparatus an embodiment of the present invention. FIG. 2 is an exploded perspective view of holder shown in FIG. 2.

The magnetic transfer apparatus 1 shown in FIGS. 1 and 2 executes simultaneous transfer to both sides by inplane recording technique mode, in which magnetic field for transfer is applied by a magnetic field applying apparatus 5 (electromagnetic devices) located upper and lower sides of a holder 10 while rotating the holder 10 which has brought master carriers 3, 4 into confronted close contact with upper and lower sides of a slave medium 2, respectively, whereby information born in the master carrier 3, 4 is magnetically transferred and recorded onto both surfaces of slave medium 2 at the same time.

The holder 10 comprises a lower side press-contact member 8 and an upper side press-contact member 9, and receives the lower side master carrier 3 for transferring a servo signal and the like onto the lower side recording surface of the slave member 2, the upper side master carrier 4 for transferring information such as a servo signal onto the upper side recording surface of the slave medium 2, a lower side elastic member 6 interposed between the lower side master carrier 3 and the lower side press-contact member 8, and an upper side elastic member 7 interposed between the upper side master carrier 4 and the upper side press-contact member 9, wherein these are compressed in the centered state thereby bringing each of lower side and the upper side master carriers 3, 4 into confronted close contact with each surface of the slave medium 2. Herein, the term, "confronted close contact" is used to indicate any of "tightly contacted state" and "faced state with an extremely small gap."

One or both of the lower side press-contact member 8 and upper side press-contact member 9 are mounted to be axially movable and operated to be opened and closed by an open-close mechanism which is not shown. In addition, said holder 10 comprises a vacuum suction means which is not shown, wherein the vacuum suction means inhales air of the internal space formed by sliding contact of the lower side press-contact member 8 and upper side press-contact member 9 to reduce the pressure of the internal side thereof, thereby obtaining a force for close contact of said slave medium 2 and upper and lower side master carriers 3, 4.

Although FIG. 2 shows a simultaneous transfer mode to both surfaces, in which the master carriers 3 and 4 are confronted with both surfaces of the slave medium 2, it is possible to bring a master carrier into confronted close contact with one surface of the slave medium, so that sequential transfer may be executed onto the one surface.

The slave medium 2 shown in the drawing is a flexible disc in which a hub 2b is secured to the center of a recording medium 2a in the form of disc and the recording medium 2a has recording surfaces each formed with a magnetic layer on the both surfaces of a disc shaped base formed from a flexible polyethylene terephthalate and the like. This slave medium may be a hard disc. If it is a hard disc, it is possible to provide a positioning pin on each of the lower side press-contact member 8 and upper side press-contact member 9, thereby positioning the slave medium together with the master carriers 3, 4.

Said lower side master carrier 3 and upper side master carrier 4 are formed as circular discs, of which one surface has a transfer information bearing surface formed by a magnetic pattern which is closely contacted with the recording surfaces of said slave medium 2, and opposite surface is retained on the lower side elastic member 6 or upper side elastic member 7 by means of vacuum adsorption, respectively.

The lower side press-contact member 8 of the holder 10 takes a form of disc and has a circular top surface larger than the outer diameter of the master carrier 3, the lower side elastic member 6 in the form of sheet is mounted on the central portion of the top surface, and the lower side master carrier 3 is retained on the top surface by means of adsorption and the like. Similarly, the upper side press-contact member 9 takes a form of disc and likely has a circular bottom surface larger than the outer diameter of the master carrier 4, the upper side elastic member 7 in the form of sheet is mounted on the bottom surface, and the upper side master carrier 4 is retained on the bottom surface by means of adsorption and the like. On the center of the lower side press-contact member 8, there is provided with a pin 8b, which fits into and positions the central hole of the hub 2b of the slave medium 2.

The outer circumference of the lower side press-contact member 8 is provided with an upwardly projected flange part 8a, and the outer circumference of the upper side press-contact member 9 is provided with a downwardly projected flange part 9a. Although not shown in detail, the diameter of outer circumference surface of the flange part 9a of the upper side press-contact member 9 is smaller than the diameter of inner circumference surface of the flange part 8a of the lower side press-contact member 8, so that the flange part 9a of the upper side press-contact member 9 is installed to be able to inserted into the inner circumference side of the flange part 8a of the lower side press-contact member 8 (the relationship of great and small sizes may be reversed). A sealing material such as O-ring which is not shown is mounted on the outer circumference of the flange part 9a of the upper side press-contact member 9, in which the sealing material is slidably contact with the inner circumference of the flange part 8a of the lower side press-contact member 8, when the upper press-contact member 9 has moved to the side of the lower side press-contact member 8, and performs sealing between the surfaces parallel to the direction of contact-separation movement (axial direction) thereby closing the internal space between the two press-contact members 8, 9. The sealing material may be mounted on the lower side press-contact member 8.

The holder 10 is provided in the cylinder structure of cylinder allowing the contact-sepatation movement of the lower side press-contact member 8 and upper side press-contact member 9 in the state that the internal space is closed, so that the closed state of internal space can be secured even if the height of close contact of the slave medium 2 and master carriers 3, 4 is changed due to change in thickness of slave medium 2, master carriers 3, 4 and elastic member 6. These lower side press-contact member 8 and upper side press-contact member 9 are connected with a rotary mechanism which is not shown and rotationally driven in union.

The inner surface of holder 10 is provided with a suction hole of vacuum suction means opened into the internal space. An air passageway, which communicates with the suction hole, is formed in the lower side press-contact member 8 or upper side press-contact member 9, extended outwardly and connected to a vacuum pump which is not shown. The vacuum suction of air by the vacuum suction means allows the internal space within the holder 10 to be controlled to a predetermined level of vacuum.

At the time of magnetic transfer, the upper side press-contact member 9 and lower side press-contact member 8 move to be approached each other by a pressure produced by the vacuum suction, thereby bringing the information bearing surfaces of the upper and lower master carriers 3, 4 and the magnetic recording surfaces of slave medium 2 into confronted close contact via the upper and lower elastic members 6, 7, and magnetic field for transfer is applied by the magnetic field applying apparatus 5 in the state that the master carriers 3, 4 and the slave medium 2 are in close contact, thereby magnetically transferring and recording the information such as servo signal. In addition, as a mode for applying a force for close contact, it is also possible to adopt a mechanical mode for applying a mechanical pressure from the outside in addition to or in replacement of the vacuum suction mode.

The material of said elastic members 6, 7 has a Young's modulus in the range of not less than $5.0 \times 10^{-5}$ Pa and not more than $3.0 \times 10^{-2}$ Pa, and has a characteristic that when a pressure for close contact is applied, it allows elastic deformation of the master carriers 3, 4 so that the surface shapes of slave medium 2 and master carriers 3, 4 are to be in conformity with each other thereby enhancing the close contact capability, and when the pressure for close contact is released, it returns to its original state at the time. If the Young's modulus is less than $5.0 \times 10^{-5}$ Pa, it is impossible to secure sufficient adherence because the force between the master carriers 3, 4 and the slave medium 2 is absorbed by the elastic members 6, 7. Furthermore, if the Young's modulus exceeds $3.0 \times 10^{-2}$ Pa, the master carriers does not smoothly deformed by the pressure for close contact and conversely there is the risk of increasing the spacing.

As the specific material of elastic members 6, 7, it is possible to use a conventional rubber such as silicon rubber, polyurethane rubber, fluorinated rubber, butadiene rubber, ethylenepropylene rubber and the like. The hardness of rubber which can be used is in the range of 10~100, preferably in the range of 40~80. Said Young's modulus is more preferably in the range of $5.0 \times 10^{-5}$ Pa~$3.0 \times 10^{-2}$ Pa and especially preferably in the range of $9.8 \times 10^{-5}$ Pa~$4.9 \times 10^{-3}$ Pa.

The thickness of elastic members 6, 7 is not less than 0.01 mm and not more than 1.0 mm. If this thickness is less than 0.01 mm, the deformation of master carriers 3, 4 is restricted whereby the close contact capability may be insufficiently secured, and if it exceeds 1.0 mm, the master carriers 3, 4 are largely deformed whereby plastic deformation may be caused.

The quantity of dusts generated from the surface of said elastic member is 0 particles/cm² for a size of 0.5 µm or over, and at most 5 particles/cm² for a size of not less than 0.3 µm and less than 0.5 µm. For example, this corresponds to the condition that 0 particles/cm² with a size of 0.5 µm or over, and at most 5 particles/cm² with a size of not less than 0.3 µm and less than 0.5 µm are deposited on a sample, after the sample from which dusts were removed is closely contacted with and released from the elastic member 6, 7. In order to limit the dust generation quantity to the above range, the elastic member 6, 7 is formed form a material of low dustability or performed with cleaning treatment for removing dusts, whereby even if it undergoes repeated close contact and release as to the slave medium 42, the materials deposited on the close contact surfaces of master carrier 43 and the slave medium 42 due to dust generation from the elastic member will be decreased and thus the signal omission due to the inferiority of close contact will be reduced.

The surfaces of elastic members 6, 7 to be contacted with the surface of slave medium 2 are formed in a flat shape parallel to the master carriers 3, 4 or a convex shape. While circular arc shape is preferred as the convex shape, so called conical shape may be used. With a circular arc or conical shape, it is desirable if the difference in height between the peripheral part and center (the height of convex part) is not more than 5% of the diameter of elastic members 6, 7.

When executing magnetic transfer, the slave medium 2 is previously magnetized by initial direct-current magnetization in the direction of tracks in the surface if it is inplane recording, or in the normal direction if it is perpendicular recording. The slave medium 2 is brought into close contact with the master carriers 3, 4 and magnetic field for transfer is applied in the track direction or in the normal direction substantially opposite to the initial direct-current magnetization direction.

A disc shaped magnetic recording medium, such as hard disc formed with a magnetic recording part (a magnetic layer) on one side or both sides, high-recording density flexible disc or the like is used as the slave medium 2. The magnetic layer consists of a magnetic recording layer of application type or a magnetic recording layer of metallic thin film type.

The master carriers 3, 4 are provided with a transfer pattern, which is formed by coating a magnetic substance on a fine unevenness pattern formed on a substrate. As the substrates of master carriers 3, 4, nickel, silicon, quartz plate, glass, aluminum, alloy, ceramics, synthetic resin and the like are used. The formation of unevenness pattern is performed by stamper method. The magnetic substance is formed by a method of forming a film using magnetic material, for example, thin film deposition means such as vacuum deposition method, sputtering method, ion plating method, or plating method and the like. In inplane recording and perpendicular recording, substantially identical master carriers are used.

In the inplane recording, the magnetic field applying apparatus 5 for applying magnetic field for transfer and initial magnetic field comprises ring-shaped head electromagnets located upper and lower sides of the holder and applies magnetic field for transfer generated parallel to the track direction in the same direction from the upper and lower sides, wherein the electromagnets includes coils wound around cores each having a gap extended, for example in the radial direction of the slave medium 2. The magnetic field for transfer is applied to the entire surfaces of slave medium 2 and master carrier 3 by rotating the holder 10. It is also possible to install the magnetic field applying apparatus to be rotated. Furthermore, it is possible to install the magnetic field applying apparatus 5 on the one side only, and it is also possible to install permanent magnetic devices on the one side or both sides.

In the perpendicular recording, electromagnets or permanent magnets of different polarities are located upper and lower sides of the holder 10 and apply magnetic field for transfer generated in the normal direction. If the transfer magnetic field is partially applied, the magnetic transfer is performed over the entire surface by moving the holder 10 or the magnetic field.

In said magnetic transfer apparatus 1, magnetic transfer is executed for a plurality number of slave mediums 2 by identical master carriers 3, 4, in which firstly the elastic members 6, 7 and master carriers 3, 4 are aligned in position and retained in the lower side press-contact member 8 and upper side press-contact member 9 of the holder 10. And, the slave medium 2 which has been initially magnetized in advance in one of the inplane direction or normal direction is set to be centered in the opened state that the upper side press-contact member 9 and lower side press-contact member 8 are separated, and then the upper side press-contact member 9 is moved to approach the lower side press-contact member 8.

Then, The internal space of holder 10 is closed by slide-contacting both of flange parts 8a, 9a of both of press-contact members 8, 9 to be fitted. Air evacuation from the internal space is performed by a vacuum suction means, so that the pressure is reduced to a predetermined level of vacuum. By this, under the pressure produced by external force (atmosphere) determined depending on the level of vacuum, the upper side press-contact member 9 applies a force for close contact toward the lower side press-contact member 8 via the elastic members 6, 7 so that the slave medium 2 is sandwiched between the upper and lower master carriers 3, 4, whereby the master carriers 3, 4 is elastically deformed under the action of the elastic members 6, 7 and brought into close contact with the slave medium uniformly with a predetermined pressure of close contact.

After this, the upper and lower magnetic field applying apparatus 5 are approached to the top and bottom surfaces of the holder 10 and magnetic field for transfer is applied substantially oppositely to the direction of initial magnetization by the magnetic field applying apparatus 5 while the holder 10 is rotated. The applied magnetic field for transfer is absorbed into the prominence patterns formed by magnetic substance in the transfer patterns of the master carriers 3, 4, which is in close contact with the slave medium 2, wherein in the case of inplane recording, the initial magnetization of these portions is not reversed and the initial magnetization of the other portions is reversed while in the case of perpendicular recording, the initial magnetization of these portions is reversed and the initial magnetization of the other portions is not reversed, whereby the magnetization patterns according to the transfer patterns of the master carriers 3, 4 are transferred and recorded onto the slave medium 2.

According to this embodiment, when the master carriers 3, 4 are closely contacted to both surfaces of the slave medium 2, each of the master carriers 3, 4 is compressed with a close contact force uniformly acting on the holder 10 through the elastic members 6, 7 and deformed by the elastic members 6, 7 within an allowed range, so that the surfaces contacted with the slave medium 2 are to be in conformity, whereby it is possible to establish uniform close contact all over the surfaces without generating any gap between the slave medium 2 and master carriers 3, 4 and to transfer and record magnetic patterns accurately corresponding to the transfer patterns formed in the master carriers 3, 4 onto the slave medium 2.

In the below, another embodiment of the present invention is described in detail.

On the center of the lower holder member 8 of said holder 10, there is provided a positioning pin 8b, which is fitted into and positions a central hole of the hub 2b of slave medium 2. The positioning of lower holder member 18b and lower master carrier 3 and the positioning of upper holder member 9 and upper master carrier 4 are performed either by aligning and fixing the central positions of both sides using a separate stage attachment measuring microscope or by respectively providing a positioning mechanism to perform the positioning of lower and upper holder members 8, 9 and master carriers 3, 4. Alternatively, the positioning of central positions of lower and upper holder members 8, 9 may be performed, for example by providing a positioning mechanism which consists of a positioning pin, which is not shown, provided on one of the holder members and a positioning hole formed on the other of the holder members to be engaged with the positioning pin.

In the close contact structure by means of the holder 10 as described in the above, the information-bearing surface (top surface) of the lower master carrier 3 retained in the lower holder member 8 and the information-bearing surface (bottom surface) of the upper master carrier 4 retained in the upper holder member 9 are installed so that deviation in parallelism between them is not more than 50 μm, and preferably not more than 5 μm.

Figure 4:
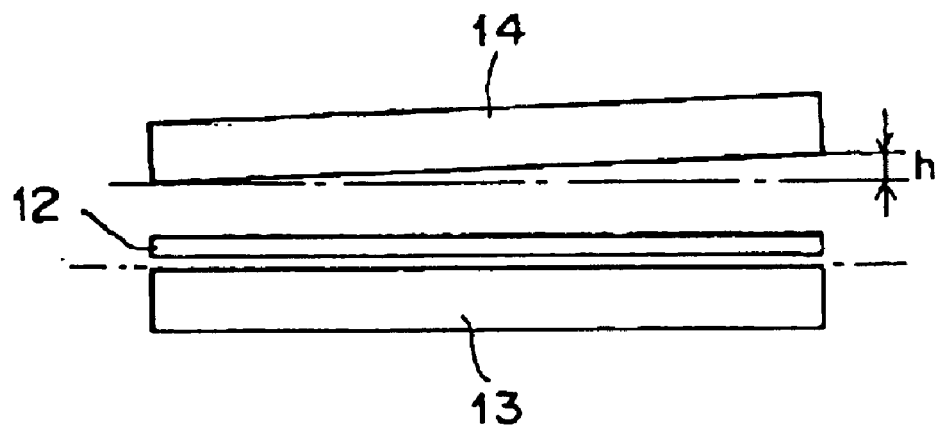
FIG. 4 illustrates deviation in parallelism between master carriers.

The term "deviation in parallelism" means, for example, the height h of the most apart portion of the information-bearing surface of upper master carrier 14 along the inclination thereof from the information-bearing surface of the lower master carrier 13 as a reference surface, when the lower master carrier 13 retained in the lower holder member 18 and the upper master carrier 14 retained in the upper holder member 19 are oppositely positioned as shown in FIG. 4 and its value is set not more than 50 μm, and preferably not more than 5 μm. That is, the term means the difference between the nearest distance and the farthest distance of both master carriers 13, 14.

The deviation in parallelism of the top surface (adsorption surface 16a) of lower holder member 18 and the bottom surface (adsorption surface) of upper holder member 19 is likely set not more than 50 μm, and preferably not more than 5 μm. This is because the master carries 13,14 are uniformly formed in thickness and flatness thereof is corrected, so that the deviation in parallelism between said lower master carrier 13 and upper master carrier 14 is substantially caused by parallelism of the top surface of lower holder member 18 and the bottom surface of upper holder member 19.

In order to secure the parallelism of the above, accuracies in forming both of master carriers 13, 14 itself and in mounting them onto the lower holder member 18 and upper holder member 19 are required as well as accuracies in forming and installing the lower holder member 18 and upper holder member 19 of holder are required.

In addition, in the closed contact structure by means of the holder 20 as described in the above, the deviation between central positions of lower master carrier 13 retained on the lower holder member 18 and upper master carrier 14 retained on the upper holder member 19 is set not more than 10 μm.

Also, the deviation between central positions of the top surface (adsorption surface 16a) of the lower holder member 18 and the bottom surface (adsorption surface) of the upper holder member 19 is likely set not more than 10 μm.

According to the present embodiment, in the close contact structure by means of the holder 20 which brings the upper and lower master carriers 14, 13 into confronted close contact with opposite sides of slave mediums 12, 21, the deviation in parallelism between the opposed lower master carrier 13 and upper master carrier 14 and the deviation in parallelism between the top surface of lower holder member 18 and the bottom surface of upper holder member 19 are set not more than 50 μm, and preferably not more than 5 μm, whereby it is possible to realize close contact of entire surfaces in the contact regions of master carriers 13, 14 and slave mediums 12, 21 with an uniform force of close contact and thus signal omission due to partial poor close contact can be prevented.

In the close contact structure, the deviation between central positions of lower master carrier 13 and upper master carrier 14, and the deviation between central positions of the top surface of the lower holder member 18 and the bottom surface of the upper holder member 19 are set not more than 10 μm, whereby in addition to the prevention of signal omission, it is possible to prevent the force for close contact from being locally applied so that scratch caused in the surfaces of slave mediums 12, 21 by one side contact with edges of master carriers 13, 14 can also be prevented.

By these, signal omission due to poor close contact and generation of scratch in slave mediums can be greatly reduced, and even in the simultaneous transfer of both sides in which the master carriers 13, 14 are closely contacted with the surfaces of the slave mediums 12 21, respectively, it will be possible to realize good magnetic transfer of both sides by controlling the deviations in parallelisms and central positions within the above ranges.

Furthermore, because each of master carriers 13, 14 is adsorbed onto an adsorption surface of high flatness by the adsorption members 16, 16, 17 when the master carriers 13, 14 are brought into close contact with the surfaces of the slave mediums 12, 21, respectively, thereby enhancing and correcting the flatness of master carriers, it is possible to obtain better close contact of entire surfaces and thus to transfer and record magnetic patterns correctly corresponding to the patterns formed on the master carriers 13, 14 onto the recording surfaces of slave medium 12.

Figure 5:
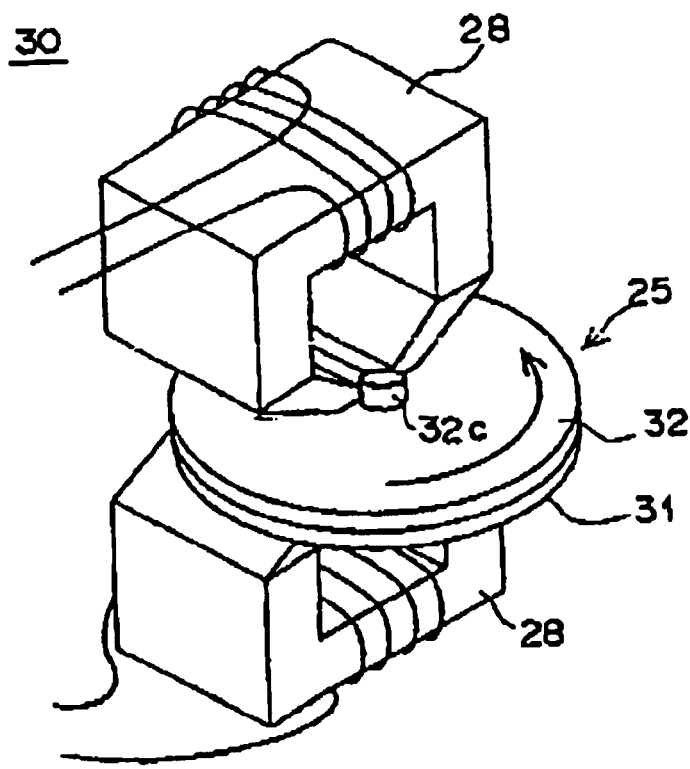
FIG. 5 is a perspective view of main parts showing the state of transfer of magnetic transfer apparatus according to another embodiment of the present invention.
Figure 6:
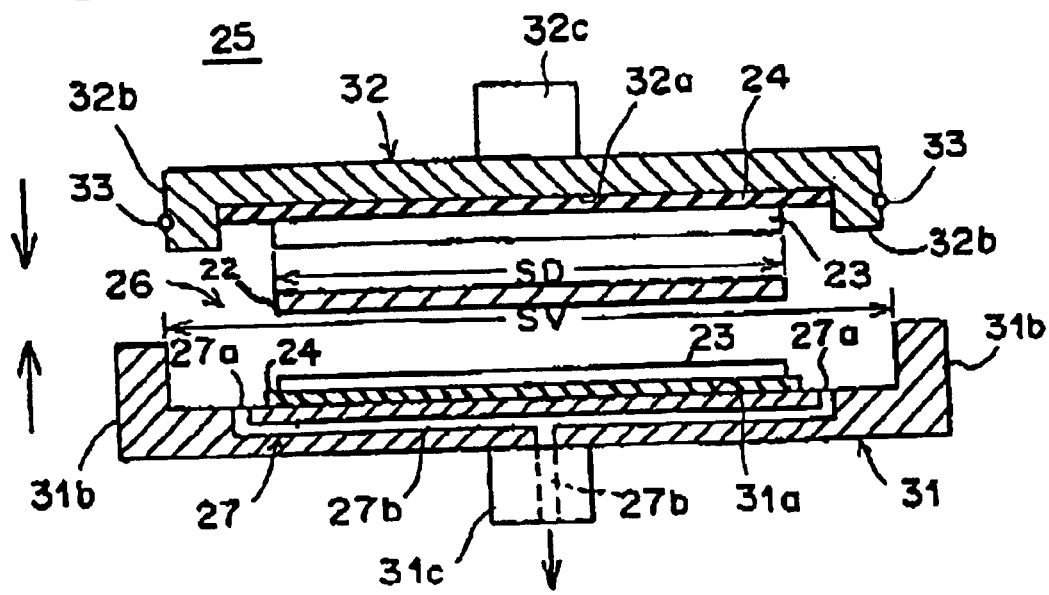
FIG. 6 is a cross-sectional view of holder.
Figure 7:
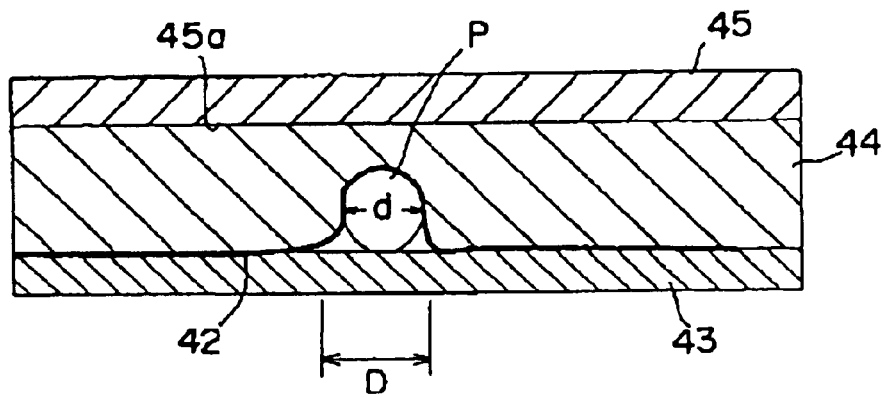
FIG. 7 shows deposited material in the magnetic transfer apparatus according to another embodiment of the present invention.
Figure 8:
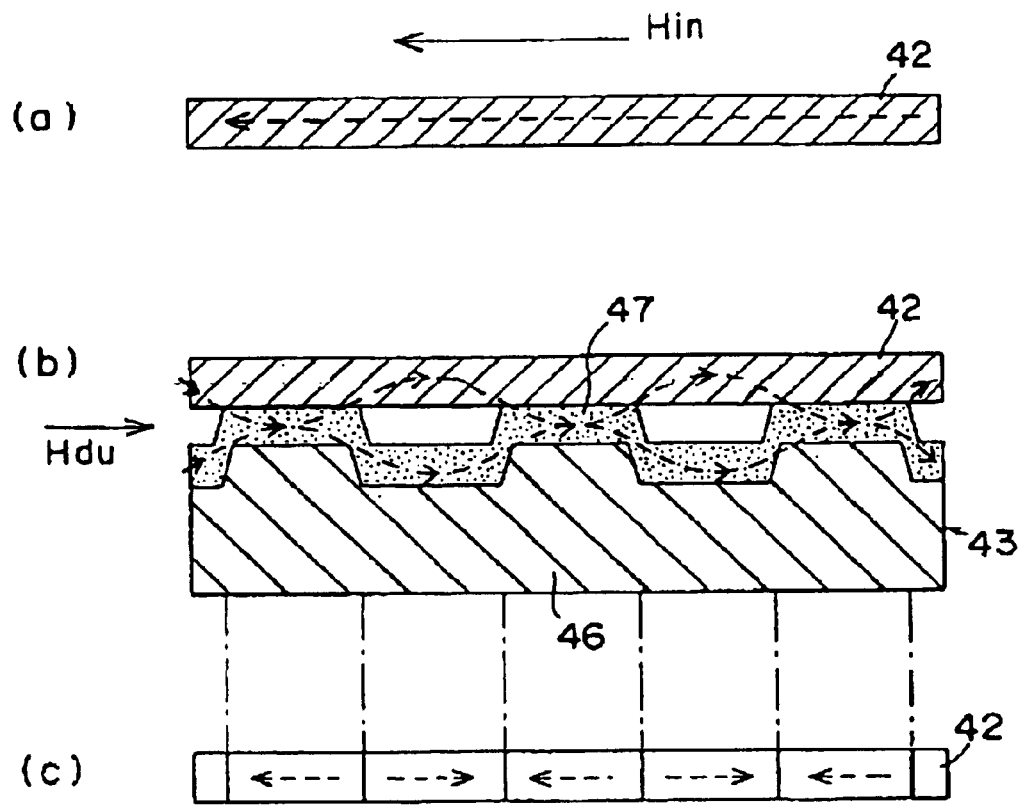
FIGS. 8(a) through 8(c) show a basic process of magnetic transfer according to another embodiment of the present invention.

In the below, another embodiment of the present invention is described in detail. FIG. 5 is a perspective view showing the transfer state of magnetic transfer apparatus according to the embodiment. FIG. 6 is a cross-sectional view. Each drawing is a schematic view and the size of each part is indicated in a scale different from the practical one.

The magnetic transfer apparatus shown in FIG. 5 comprises a lower side chamber 31 and an upper side chamber 32 in the cylinder structure, a holder 25 which receives a slave medium 22, a master carrier 23 and an elastic material 24 within a closed space 26 formed in the internal side thereof as shown in FIG. 6 and brings the slave medium 22 and master carrier 23 into confronted close contact with each other in the centered state, a vacuum suction means 27 for inhaling air from the closed space 26 within the holder 25 to turn the internal side into the pressure reduced state for obtaining a force for close contact, and a magnetic field applying apparatus 28 for applying magnetic field for transfer while the holder is being rotated.

Although FIG. 6 shows a mode of simultaneous transfer in which the master carriers 23 are brought into confronted close contact with the top and bottom surfaces of the slave medium 22 respectively so that simultaneous transfer for both surfaces can be executed. Herein, the term, "confronted close contact" is used to indicate any of "tightly contacted state" and "oppositely faced state with an extremely small gap."

The lower side chamber 31 of the holder 10 takes a form of disc and has a circular top surface 31a larger than the outer diameter of the master carrier 23, and the lower side master carrier 23 is retained on the top surface 31a by means of adsorption and the like interposing the elastic member 24 therebetween. The upper side chamber 32 takes a form of disc and likely has a circular bottom surface 32a larger than the outer diameter of the slave medium 22, an elastic member 24 in the form of sheet is attached on the bottom surface 32a, and the master carrier 23 is retained on the bottom surface of the elastic member 24. The upper and lower side chambers 31, 32 are capable of performing contact-separation movement up and down and adapted to compress and bring the master carriers 23 into confronted close contact with both surfaces of the slave medium 22. The slave medium 22 may be set on the master carrier 23.

The outer circumference of the lower side chamber 31b is provided with an upwardly projected flange part 31b, and the outer circumference of the upper side chamber 32 is provided with a downwardly projected flange part 32b. Although not shown in detail, the diameter of outer circumference surface of the flange part 32b of the upper side chamber 32 is smaller than the diameter of inner circumference surface of the flange part 31b of the lower side chamber 31, so that the flange part 32b of the upper side chamber 32 is installed to be able to inserted into the inner circumference of the flange part 31b of the lower side chamber 31 (the relationship of great and small sizes may be reversed). A sealing material 33 such as O-ring is mounted on the outer circumference of the flange part 32b of the upper side chamber 32, in which the sealing material 33 is sliding contact with the inner circumference of the flange part 31b of the lower side chamber 31, when the upper side chamber 32 has moved to the side of the lower side chamber 31, and performs sealing between the surfaces parallel to the direction of contact-separation movement (axial direction) thereby sealing the closed space 26 between two chambers 31, 32. The sealing material 33 may be mounted on the lower side press-contact member 31.

The holder 30 is provided in the cylinder structure allowing the contact-separation movement of the lower side chamber 31 and upper side chamber 32 in the state that the closed space is sealed by means of the sealing material 33. In addition, the sealed state can be secured even if the height of close contact of the slave medium 22 and master carrier 23 due to change in thickness of slave medium 22, master carrier 23, and elastic material 24.

From the bottom surface of lower side chamber 31 and top surface of upper side chamber 32, rotary shafts 31c, 32c are projected. These lower side chamber 31 and upper side chamber 32 are connected to a rotary mechanism which is not shown and rotated in union.

In addition, the lower side chamber 31 is opened by a suction hole 27a of vacuum suction means 27 in the area of top surface more inner than the flange part 31b and more outer the master carrier 23. An air passageway 27b which communicates with the suction hole 27a is formed in the lower side chamber 31, extended to the outside through the rotary shaft 31c, and connected to a vacuum pump which is not shown.

The vacuum suction of air by the vacuum suction means 27 allows the closed space 26 formed by the upper side chamber 32 and lower side chamber 38 to be controlled to a predetermined level of vacuum. By this, the slave medium 22 and master carrier 23 are set to be a predetermined pressure for close contact.

In order to be in the above pressure for close contact, the effective area (SV) of vacuum suction region in said holder 25 and the contact area (SD) of the master carrier 23 and slave medium 22 are set to meet with following relationship:

$$1.2 \leq (SV/SD) \leq 16.0$$

The effective area (SV) of said vacuum suction region is the projected area of the closed space 26 which is more inner than the flange part 31b of lower side chamber 31, and the contact area (SD) is the area that the master carrier 23 and slave medium 22 are practically in contact with each other, wherein the the vacuum suction area (SV) is set to be larger than the contact area (SV) by 1.2~16.0 times to obtain a predetermined force for close contact in accordance with the vacuum level.

Figure 9:
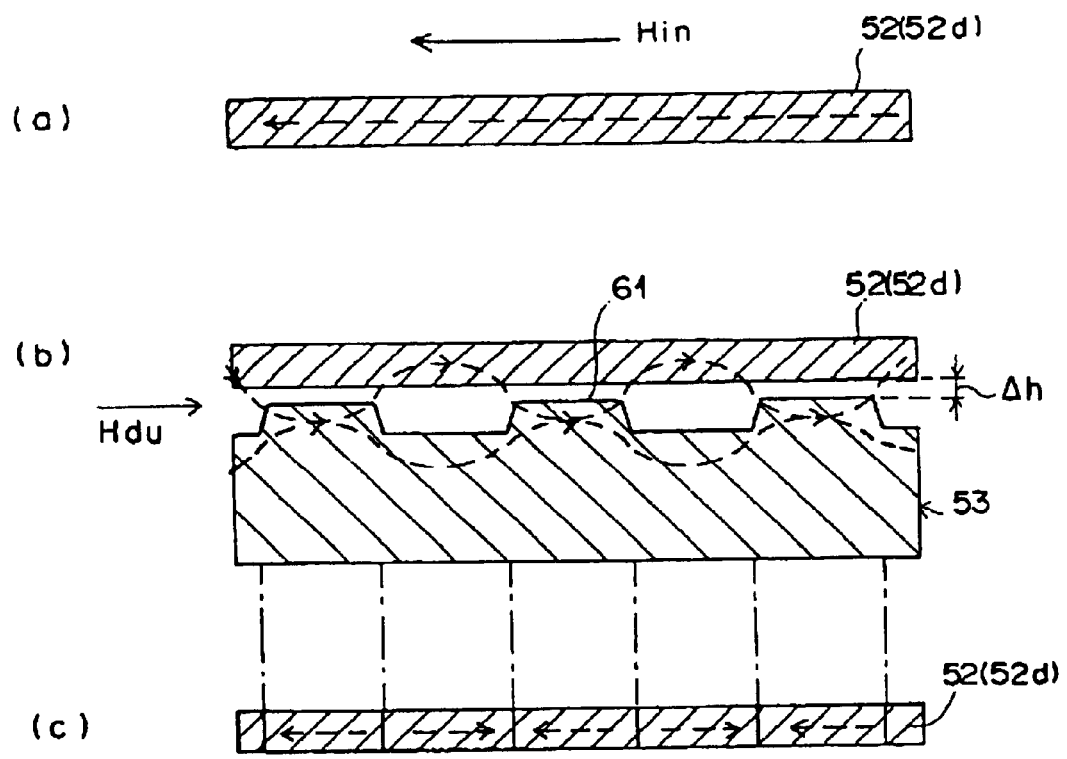
FIGS. 9(a) through 9(c) show a method of magnetic transfer using a master carrier according to an embodiment of the present invention.
Figure 11:
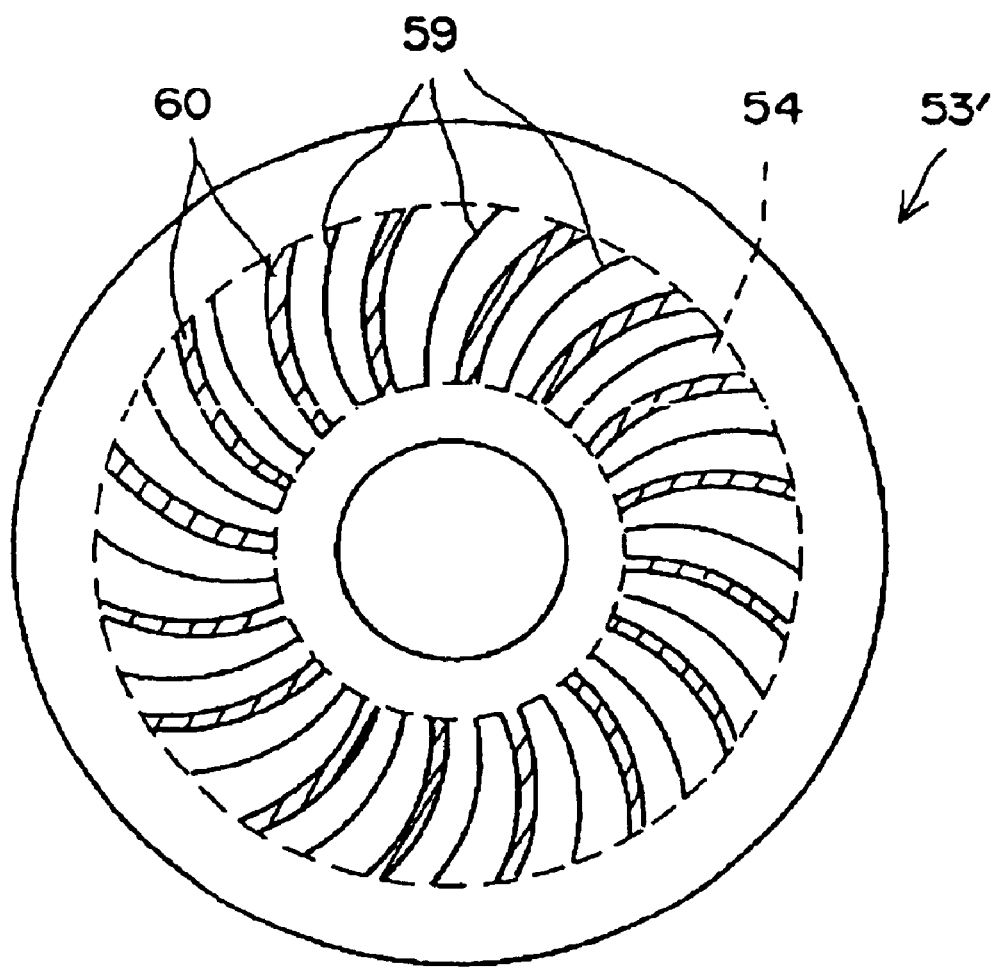
FIG. 11 is a top plan view of a master carrier according to another embodiment present invention.

As shown in FIG. 9(b), the surface of the magnetic recording and reproducing layer 52d of this slave medium 52 and the information-bearing surface formed with the unevenness pattern of master carrier 53 is confronted with a distance $\Delta h = 1$ nm~100 nm between them and magnetic transfer is executed by applying transfer magnetic field Hdu in the direction of tracks of slave medium 52 opposite to the initial magnetic field Hin. As a result, information (for example, servo signal) according to the unevenness pattern of information-bearing surface of master carrier 53 is magnetically transferred and recorded on the magnetic recording and reproducing layer 52d of slave medium 52, as shown in FIG. 9(c). Although FIG. 11 shows only one-sided magnetic recording and reproducing layer 52d of slave medium for convenience, the slave medium 52 is a disc medium having magnetic recording and reproducing layers consisting of magnetic layers formed on one or both surfaces of a support.

Figure 10:
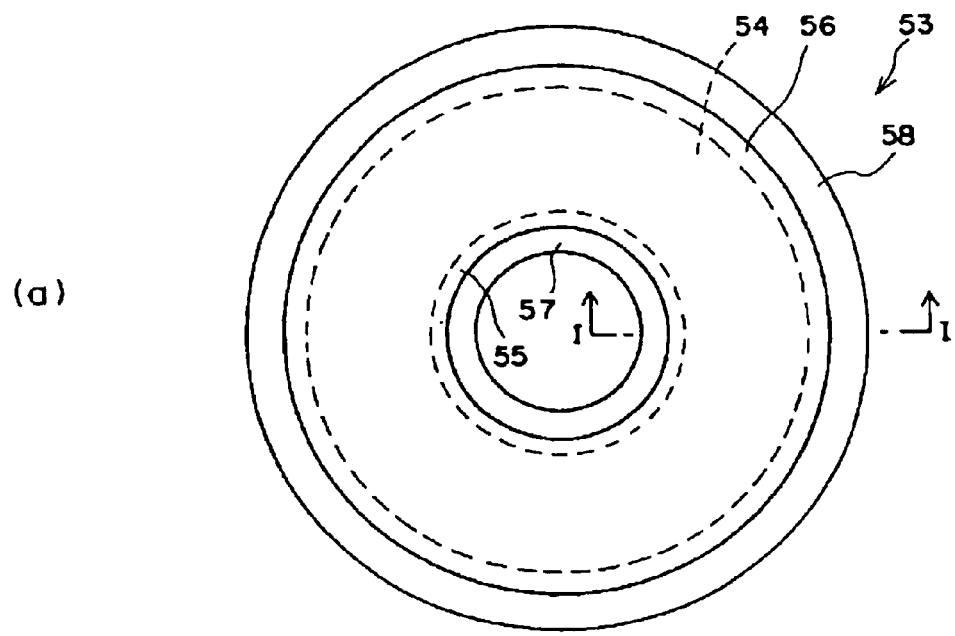
FIGS. 10(a) and 10(b) are top plan and cross-section views of a master carrier according to an embodiment of the present invention.
Figure 10:
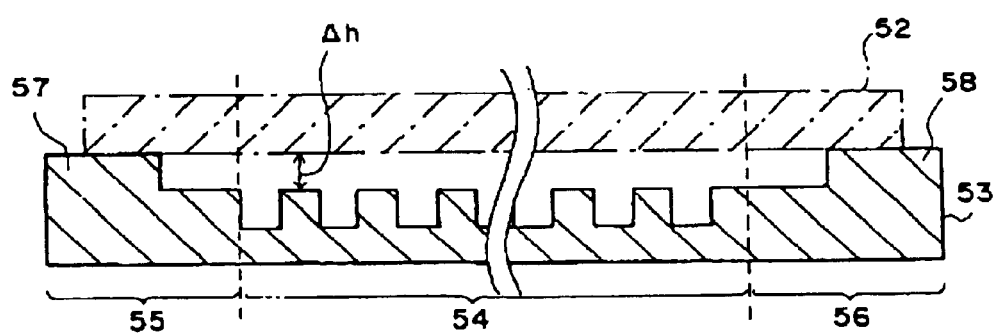

The specific shape of master carrier used for applying the transfer magnetic field in the state that the slave medium and the unevenness pattern of master carrier for transfer are spaced by a distance Δh is shown in FIG. 10. FIG. 10(a) is a top plan view of master carrier and FIG. 10(b) is a cross-sectional view taken along the line I—I of FIG. 10(a).

As shown in FIG. 10(a), the master carrier 53 is formed in the shape of disc, in which the doughnut shaped region surrounded by dot lines is the transfer region 54 formed with an unevenness pattern for transferring information onto the slave medium. And, the regions of the inner circumference and outer circumference of the transfer region 54 are non-transfer regions 55, 56 and supporting convex parts 57, 58 are formed on a portion of the non-transfer regions 55, 56. The convex part 57 is formed on the periphery of inner non-transfer region 55 in a ring shape and another convex part 58 is formed on the periphery of outer non-transfer region 55 in a ring shape.

As shown in FIG. 10(b), the supporting convex parts 57, 58, which formed in the inner non-transfer region 55 and the outer non-transfer region 56, respectively, are higher than the prominent surface of each unevenness pattern and the difference in height between the surface of convex parts and the prominent surface, Δh is about 1 nm to 100 nm.

FIG. 10(b) shows the slave medium 52 on the master carrier 53 in one dot chainline. As shown in FIG. 10(b), unused regions of the inner and outer circumferential margins and the supporting convex parts 57, 58 of the master carrier 53 are contacted and then magnetic transfer is executed in the state that the unevenness pattern of master carrier 53 and the surface of slave medium 52 is spaced. Therefore, the friction between the unevenness pattern and slave medium 52 at the time of transfer is suppressed, whereby the abrasion of shape of unevenness pattern can be inhibited and the service life of master carrier can be lengthened. Furthermore, because only the master carrier and convex parts of slave medium are in contact with each other, it is easy to peel off these two mediums and separation of lubricant or magnetic layer can be reduced.

The master carrier 53 shown in FIG. 10 comprises ring-shaped convex parts 57, 58 in the non-transfer regions 55, 56 but the convex parts provided to prevent contact between the unevenness pattern of master carrier and slave medium may take a form of spot or circular arc and also may be positioned on the non-transfer region of the inner circumferential side and/or the non-transfer region of the outer circumferential side.

FIG. 11 shows another example of master carrier 53' for magnetic transfer. If the information transferred onto a magnetic recording medium by magnetic transfer is a servo signal, the servo signal is generally recorded in servo fields regularly and equi-angularly positioned in a disc (the servo information is recorded and forms servo field). The region corresponding to the servo field on the master carrier 53' is the region depicted in a linear shape in FIG. 11 within the aforementioned transfer region 54 shown in the master carrier 53. Only in this region, an unevenness pattern according to servo information is formed and the other part does not carry any information and conventionally takes a flat form. In the master carrier 53' for magnetic transfer, the part conventionally formed in a flat shape is provided with a supporting convex part 60 having a surface, the height of which is higher than the prominent surface of unevenness pattern. The region formed with the convex part 60 corresponds to the data region on magnetic disc. Because the magnetic transfer is executed in the state that the supporting convex part 60 of the master carrier 53' and the data region of slave medium 52 are contacted and thus the unevenness pattern of the master carrier 53' which bear information are spaced from the surface of slave medium 52, the above-mentioned effects can be obtained. In addition, it may be possible to provide supporting convex parts on inner and outer circumferential margins, after providing the supporting convex part 60 on the portion corresponding to the data region.

Next, manufacture of said master carrier is described. As a substrate of master carrier, nickel, silicon, quartz plate, glass, aluminum, alloy, ceramics, synthetic resin and the like are used. The unevenness pattern is formed by stamper method, photo lithography method and the like.

The stamper method comprises steps of: forming a photoresist on a glass disk (or quartz plate) having a smooth surface by spin coat and the like, illuminating a laser light (or electron beam) modulated to correspond with servo signals while rotating the glass disk to expose a predetermined pattern, for example a pattern, which is radially extended from the rotational center of each track in a linear shape and corresponds to servo signals, onto a circumferential portion, which correspond to each frame, in the front surface of photoresist. Thereafter, the photoresist is developed to remove exposed portions, and thus a disc having unevenness shape formed by the photoresist is obtained. Next, on the basis of the surface unevenness pattern of the disc, plating (electroforming) is performed on this surface to prepare a Ni substrate having an unevenness pattern of positive form, and the substrate is peeled off from the disc. This substrate is used as a master carrier as it is, or after coated with a soft magnetic layer and a protecting film on the unevenness pattern as desired.

A substrate having a negative unevenness pattern may be prepared in such a manner that the first disc is plated to prepare a second disc and then the second disc is plated. Also, a substrate having a positive unevenness pattern may be prepared in such a manner that second disc is plated, or cured after press coating a resin solution on it to prepare the third disc, and then the third disc is plated.

On the other hand, a pattern is formed on the glass disk using a photoresist, and then the glass disk is formed with hole by etching to obtain a disc in which the photoresist is removed. Thereafter, the substrate may be formed in the same manner described above.

For a metallic material for substrate, Ni or Ni alloy can be used, and as plating method for preparing such a substrate, various metallic film deposition methods including non-electrolysis plating, electroforming, sputtering, ion plating could be applied. The depth of unevenness pattern of substrate (height of prominences) is preferably in the range of 80 nm~800 nm, and more preferably in the range of 100 nm~600 nm. In the case of servo signal, this unevenness pattern is formed to be extended in the radial direction. For example, it is preferred if the radial length is 0.3~20 μm and circumferential length is 0.2~5 μm and as a pattern for bearing servo signal information, it is preferred to select a radial length longer than a circumferential length within the above ranges.

If the substrate is formed from a ferromagnetic material such as Ni, it may possible to execute magnetic transfer with the substrate only without coating the magnetic layer. However, if the magnetic layer with good transfer characteristic is coated, better transfer can be executed. If the substrate is formed from a non-magnetic material, it is required to provided the magnetic layer.

The magnetic layer is formed by method of forming a film, for example a thin film deposition means such as vacuum deposition method, sputtering method, ion plating method, or plating method and the like using a magnetic material film. For the magnetic material of magnetic layer, Co, Co alloy (CoNi, CoNiZr, CoNb, TaZr and the like), Fe, Fe alloy (FeCo, FeCoNi, FeNiMo, FeAlSi, FeAl, FeTaN), Ni, and Ni alloy (NiFe) can be used. Most preferred materials are FeCo and FeCoNi. The thickness of magnetic layer is preferably in the range of 50 nm~500 nm, and more preferably in the range of 100 nm~400 nm.

It is also preferable to provide a protection layer such as diamond like carbon (DLC) on the magnetic layer and a lubricant layer may be provided. In addition, it is more preferable if there are a DLC film of 5~30 nm and a lubricant layer. An adhesion-reinforcing layer such as Si may be provided between the magnetic layer and protection layer. By this protection layer, the adhesion endurance will be enhanced, whereby magnetic transfer can be executed over a number of times.

It is possible to manufacture a resin substrate using said disc, and then to form a magnetic layer on its surface, thereby using it as a master carrier. For the resin material of resin substrate, it is possible to use acryl resin such as polycarbonate and polymethyl methacrylate, vinyl chloride resin such as polyvinyl chloride-vinyl chloride copolymer, epoxy resin, amorphous polyolephin and polyester and the like. In view of moisture resistance, dimensional stability, price, and the like, polycarbonate is most preferred. If burr is present in a formed article, it may be removed by burnishing or polishing. In addition, UV-curing resin, electron beam curing resin and the like may be applied on the disc by bar-coat or spin-coat. The height of prominences of pattern in resin substrate is preferably in the range of 50~1000 nm, and more preferably in the range of 100~500 nm.

A master carrier is obtained by coating a magnetic layer on the fine pattern in the surface of said resin substrate. The magnetic layer is formed by method of forming a film, for example a thin film deposition means such as vacuum deposition method, sputtering method, ion plating method, or plating method and the like using a magnetic material film.

Meanwhile, the photo lithography method comprises steps of: applying photoresist on a smooth surface of a substrate, for example, in the shape of flat plate, and forming a pattern according to information by exposure using a photomask according to a servo signal pattern and development treatments. Following this, by etching process, etching is performed on the substrate following the pattern, thereby forming bores having a depth corresponding to the thickness of magnetic layer. Then, a magnetic material is deposited to the surface of substrate to a thickness corresponding to the depth of formed bores by thin film deposition means such as vacuum deposition method, sputtering method and ion plating method, and plating method. Following this, the photoresist is removed by lift-off method, the surface is polished, and if burr is present, the surface is smoothened simultaneously with removing burr.

In inplane recording and perpendicular recording, substantially identical master carriers are used. In the case of perpendicular recording, the magnetization of slave medium is performed in such a manner that the slave medium previously undergoes initial direct current magnetization in one direction, the slave medium is brought into close contact with the master carrier, and then magnetic transfer is executed by applying magnetic field for transfer in the normal direction substantially opposite of the direction of initial direct current magnetization, wherein the magnetic field for transfer is absorbed into the magnetic layer on closely contacted prominences of master carrier, and perpendicular magnetization in the portions corresponding to the closed prominences are reversed, whereby a magnetization pattern corresponding to the unevenness pattern can be recorded on the slave medium.

Next, the slave medium is described. As the slave medium, a disc shaped medium formed with magnetic recording part (magnetic layer) on one surface or both surfaces thereof, such as high-recording density flexible disc, hard disc and the like, and the magnetic recording part is consisted of an application type magnetic recording layer or metallic thin film type magnetic recording layer. As the magnetic material of magnetic layer, Co, Co alloy (CoNi, CoNiZr, CoNb, TaZr and the like), Fe, Fe alloy (FeCo, FeCoNi, FeNiMo, FeAlSi, FeAl, FeTaN), Ni, and Ni alloy (NiFe) can be used. It is preferable if the magnetic material has a higher magnetic flux density and a magnetic anisotropy in the same direction as the magnetic field applying direction (inplane direction in the case of inplane recording and normal direction in the case of perpendicular recording), because more clear transfer can be executed. And, in order to provide a required magnetic anisotropy to the underside (support side) of magnetic material, it is preferable to form a non-magnetic base layer. It is required to conform the crystal structure and lattice to the magnetic layer. For this purpose, Cr, CrTi, CoCr, CrTa, CrMo, NiAl, Ru and the like are used.

Furthermore, if a disc is formed with a groove deeper than depressions of unevenness pattern in a region, which corresponds to the non-transfer region of substrate of master carrier at the time of manufacturing the disc, and the disc is used, it is easy to obtain a substrate have a convex part, the surface of which is higher than the prominent surface of unevenness pattern.

Meanwhile, the magnetic transfer may be executed using a conventional master carrier, which is not provided with a supporting convex part as described in the above, for example, the one that can serve as a holder for supporting a master carrier and slave medium to be confronted so that the distance between the unevenness pattern of the master carrier and the surface of slave medium is to be 1~100 nm.

According to said embodiment, magnetic transfer was executed on slave mediums and master carriers and then transfer signals of the slave mediums and endurance of the master carriers were analyzed. The results obtained from the analysis are described herein below.

Master carriers which had transfer pattern-reversed intervals of 1.0 $\mu$m, 0.3 $\mu$m and 0.5 $\mu$m, respectively, were prepared, and magnetic transfer was separately executed to each master carrier in the state that space between the each mast carrier and a slave carrier (distance from the prominent surface of the unevenness pattern of each master carrier to the surface of each slave medium) was set to 0, 1, 20, 40, 80, 100, 120 and 150 nm, using each of the master carriers. C/N measurement was performed for transfer signals of each slave medium, which underwent magnetic transfer under each of the above conditions using an MR (magnetic resistance effect) head. Herein, read out signals were frequency-resolved and ratio C/N between peak intensity of first signal C and narrow band noise N was measured. Assuming that the value of C/N is 0 dB if and when the master carrier and slave medium was in completely close contact with each other and the space between them was zero, the relative value, ΔC/N (dB) was calculated while changing the space. The results are shown in FIG. 1.

TABLE 1

| A transfer pattern-reversed interval (μm) | A master-slave Space(nm) | | | | | | | |
|---|---|---|---|---|---|---|---|---|
| | 0 | 1 | 20 | 40 | 80 | 100 | 120 | 150 |
| 0.1 | 0(dB) | −0.1 | −0.5 | −1.0 | −4.0 | −6.0 | −8.0 | −12.0 |
| 0.3 | 0 | 0 | −0.4 | −0.7 | −2.8 | −4.5 | −6.0 | −8.0 |
| 0.5 | 0 | 0 | −0.3 | −0.5 | −1.5 | −2.1 | −3.0 | −4.1 |

As shown in Table 1, depending on the space (Δh) between the unevenness of master carrier and slave medium, C/N was decreased as Δh was increased. From the test results, it became clear that if the master-slave space exceeds 100 nm, the transfer accuracy is seriously deteriorated and it is not practical.

Meanwhile, in order to investigate endurance of a master carrier and damage on a slave medium, a plurality of master carriers were prepared in a same condition and a plurality times of magnetic transfer were executed while setting each master-slave space to 0, 1, 20, 40, 80, 100, 120, 150 nm.

TABLE 2

| master-slave space (nm) | 0 | 1 | 20 | 40 | 80 | 100 | 120 | 150 |
|---|---|---|---|---|---|---|---|---|
| endurance of master | 100 times | above 1000 times | above 1000 times | above 1000 times | above 1000 times | above 1000 times | above 1000 times | Above 1000 times |
| damage of slave | none | none | none | none | none | none | none | none |

As indicated in Table 2, it has been found that if magnetic transfer is executed in the state that a master carrier and a slave medium are in close contact with each other, the master carrier becomes defective to be unusable with use of about 100 times, while if magnetic transfer is executed in the state that a master carrier and a slave medium are spaced, the magnetic transfer could be executed over 1000 times or more.

In addition, when magnetic transfer was executed in the state that a master carrier and a slave medium were spaced, the slave medium was not damaged, although the slave was damaged if the master carrier and slave medium were in close contact with each other.

From the above results, it has been found that the spaced distance between the master carrier and slave medium appropriate for magnetic transfer is from about 1 nm to 100 nm.

Next, evaluation tests for the above embodiments, which were performed while varying elastic materials and close contact conditions for each of embodiments will be described.

<Preparation of Master Carriers>

Stamper method was used in preparing master carriers. The master carrier is formed with an uneven pattern having bit length of 0.5 μm, track width of 10 μm, track pitch of 12 μm, in the positions of 20~40 μm from the center in the radial direction.

A layer of FeCo 30 at % was formed on a Ni substrate as a soft magnetic layer. The film thickness was 200 nm, the Ar spattering pressure was $1.5 \times 10^{-4}$ Pa (1.08 mTorr) and the input electric power was 2.0 W/cm².

<Preparation of Slave Mediums>

In a thin film deposition apparatus(S-50S spattering apparatus available from Shibaura Mechatronics Company), the pressure was reduced to $1.33 \times 10^{-5}$ Pa ($10^{-7}$ Torr) at a room temperature and then increased to 0.4 Pa ($3 \times 10^{-3}$ Torr) by introducing argon, and an aluminum plate was heated at 200° C., whereby a 3.5 inch type disc-shaped magnetic recording medium (hard disc) which has CrTi of 60 nm, CoCrPt of 25 nm, magnetic density (Ms) of 5.7 T(4500 Gauss) and coercive force (Hcs) of 199 kA/m (2500 Oe) was prepared and used as a slave medium.

<Method for Testing Magnetic Transfer>

In order to make peak intensity of magnetic field to 398 kA (5000 Oe: two times of coercive force (Hcs) of slave medium), initial direct current magnetization was executed using electromagnet devices. Next, the slave medium which underwent the initial direct current magnetization was brought into close contact with a master carrier and magnetic transfer was executed by applying the transfer magnetic field of 199 kA/m (2500 Oe) using the electromagnet devices. In addition, when bringing the master carrier and slave medium into contact with each other, an elastic material having characteristics as listed in Table 3 to be described below was interposed between the master carrier and holder. Besides, the close contact conditions were set as in Table 3.

<Method for Measuring Dust Generation Quantity of Elastic Material>

After an elastic material is tumbled 50 times on a Si wafer, the surface of Si wafer is observed randomly at 100 places in dark fields with a 50× magnifying power. After the positions of generated dusts are ascertained, size of each generated dust is observed with a differential interference contrast microscope, and the number of generated dusts having size of 0.3 μm or more is counted. From the number of generated dusts and observed area, the density of generated dusts is calculated.

<Method for Evaluating Signal Omission and Close Contact>

The slave medium, which underwent magnetic transfer, was developed by ten times diluting a magnetic development solution (product of Sigma Hi-Chemical, Inc.: Sigmarker Q), dropping it onto the slave medium, and then drying it, and variation of quantity of developed magnetic transfer signal unit is evaluated. Using a differential interference contrast microscope, signal omission present in a slave medium is observed randomly in 100 fields with a 50× magnifying power. If signal omission is present in 5 or less places among the 100 fields it is evaluated as good (○), if signal omission is present in 5~10 places it is evaluated as possible (Δ), and if the signal omission is present in 11 or more places it is evaluated as poor (x). The results are shown in Table 3.

<Measurement of Endurance>

Contact and release between a master carrier and a slave medium are repeated 1000 times and then the surface of master carrier is observed randomly in 50 fields with a 480× magnifying power using a differential interference contrast microscope. Among the 50 fields, if abrasion or crack of magnetic layer is present in two or less places it is evaluated as good (○), if abrasion or crack is present in 3~5 places it is evaluated as possible (Δ), and if the signal omission is present in 6 or more places it is evaluated as poor (x). The results are shown in Table 3.

TABLE 3

| | Material having an elastic property | | | | Signal omission | | Endurance | | Synthetic |
|---|---|---|---|---|---|---|---|---|---|
| | Kind | Young's modulus (Pa) | Thickness (nm) | SV/SD | Places | Evaluation | Places | Evaluation | evaluation |
| Example 1 | Ethylen-propylen rubber | $6.0 \times 10^{-5}$ | 1.5 | 2.5 | 2 | ○ | 4 | Δ | Δ |
| Example 2 | Ethylen-propylen rubber | " | 0.9 | " | 3 | ○ | 0 | ○ | ○ |
| Example 3 | Ethylen-propylen rubber | " | 0.2 | " | 4 | ○ | 0 | ○ | ○ |
| Example 4 | Ethylen-propylen rubber | " | 0.05 | " | 7 | Δ | 0 | ○ | Δ |
| Example 5 | Nitrile rubber | $2.7 \times 10^{-2}$ | 0.9 | " | 3 | ○ | 1 | ○ | ○ |
| Example 6 | Urethane rubber | $3.0 \times 10^{-6}$ | | " | 5 | Δ | 1 | ○ | Δ |
| Example 7 | Urethane rubber | $3.5 \times 10^{-2}$ | " | " | 7 | Δ | 5 | Δ | Δ |
| Example 8 | Ethylene-propylene rubber | $6.0 \times 10^{-5}$ | " | 1.3 | 4 | ○ | 1 | ○ | ○ |
| Example 9 | Ethylene-propylene rubber | " | " | 16.0 | 0 | ○ | 1 | ○ | ○ |
| Example 11 | Ethylene-propylene rubber | " | " | 0.9 | 9 | Δ | 0 | ○ | Δ |
| Example 12 | Ethylene-propylene rubber | " | " | 18.0 | 1 | ○ | 5 | Δ | Δ |
| Comparative Example 1 | none | | | 2.5 | 12 | X | 7 | X | X |

What is claimed is:

1. A magnetic transfer apparatus which executes magnetic transfer by applying a magnetic field for transfer after a master carrier that bore transfer information and a slave medium to be subjected to transfer are brought into confronted close contact with each other and received within a holder, characterized in that a material having an elastic property is interposed between said holder and said master carrier, wherein a Young's modulus of the material having an elastic property is not less than $5.0 \times 10^{-5}$ Pa and not more than $3.0 \times 10^{-2}$ Pa.

2. A magnetic transfer apparatus which executes magnetic transfer by applying a magnetic field for transfer after a master carrier that bore transfer information and a slave medium to be subjected to transfer are brought into confronted close contact with each other and received within a holder, characterized in that a material having an elastic property is interposed between said holder and said master carrier, wherein a thickness of the material having an elastic property is not less than 0.01 mm and not more than 1.0 mm.

3. A magnetic transfer apparatus which executes magnetic transfer by applying a magnetic field for transfer after a master carrier that bore transfer information and a slave medium to be subjected to transfer are brought into confronted close contact with each other and received within a holder, characterized in that a material having an elastic property is interposed between said holder and said master carrier, wherein a quantity of dusts having a size of 0.5 μm or over to be generated from the surface of said material having an elastic property interposed between the holder and the master carrier is 0 particles/cm².

4. A magnetic transfer apparatus which executes magnetic transfer by applying a magnetic field for transfer after a master carrier that bore transfer information and a slave medium to be subjected to transfer are brought into confronted close contact with each other and received within a holder, characterized in that a material having an elastic property is interposed between said holder and said master carrier, wherein a quantity of dusts having a size of not less than 0.3 μm and less than 0.5 μm to be generated from the surface of said material having an elastic property interposed between the holder and the master carrier is at most 5 particles/cm².

5. A magnetic transfer apparatus which comprises a holder for receiving a master carrier that bore transfer information and a slave medium to be subjected to transfer within a closed space so that they are brought into confronted close contact with each other;
a vacuum suction means for evacuating said closed space of the holder to obtain a force for close contact between the slave medium and the master carrier; and
a magnetic field applying apparatus for applying a magnetic field for transfer,
wherein the effective area (SV) of a absorbed region of said holder and the contact area (SD) between the master carrier and the slave medium satisfy the following relationship:

$$1.2 \leq (SV/SD) \leq 16.0$$

6. A magnetic transfer method of executing magnetic transfer by applying magnetic field for transfer after a master carrier that bore transfer information and a slave medium to be subjected to transfer are brought into confronted close contact with each other and received within a holder, wherein the spacing between the master carrier and the slave medium is 1~100 nm when said magnetic field for transfer is applied.

* * * * *